United States Patent
Robinson et al.

(10) Patent No.: US 7,166,805 B2
(45) Date of Patent: Jan. 23, 2007

(54) CABLE HARNESS BREAKOUT AND METHOD FOR ITS ASSEMBLY

(75) Inventors: Paul W. Robinson, Bainbridge Island, WA (US); Terry M. Kleeberger, Tacoma, WA (US); Billie D. Eliot, Redmond, WA (US)

(73) Assignee: Carlyle, Inc, Tukwila, WA (US)

( * ) Notice: Subject to any disclaimer, the term of this patent is extended or adjusted under 35 U.S.C. 154(b) by 0 days.

(21) Appl. No.: 11/073,286

(22) Filed: Mar. 3, 2005

(65) Prior Publication Data

US 2005/0241847 A1 Nov. 3, 2005

Related U.S. Application Data

(62) Division of application No. 10/836,586, filed on Apr. 29, 2004.

(51) Int. Cl.
*H02G 15/00* (2006.01)

(52) U.S. Cl. .............. 174/154; 174/138 G; 174/77 R; 174/135; 174/DIG. 8

(58) Field of Classification Search .............. 174/154, 174/138 G, 77 R, 135, DIG. 8
See application file for complete search history.

(56) References Cited

U.S. PATENT DOCUMENTS

| | | | |
|---|---|---|---|
| 2,299,140 A | 10/1942 | Hanson | |
| 3,346,688 A | 10/1967 | Fields | |
| 3,861,015 A | 1/1975 | Hooven | |
| 3,949,457 A | 4/1976 | Fortsch | |
| 3,984,622 A | 10/1976 | Ross | |
| 4,063,350 A | 12/1977 | Evans | |
| 4,366,938 A * | 1/1983 | McSpadden | .............. 248/61 |
| 4,384,167 A | 5/1983 | Nestor | |
| 4,400,047 A | 8/1983 | Simms | |
| 4,424,627 A | 1/1984 | Tarbox | |
| 4,464,834 A | 8/1984 | Simms | |
| 4,693,767 A * | 9/1987 | Grzanna et al. | .............. 156/49 |
| 4,711,025 A | 12/1987 | DeSanto | |
| 4,972,042 A * | 11/1990 | Seabourne et al. | ....... 174/23 R |
| 4,972,576 A | 11/1990 | Sloppy et al. | |

(Continued)

OTHER PUBLICATIONS

Nortel Networks, Compatible Products—JCS Cable Assembly, http://www.nortelnetworks.com/prd/dpp/product/prodpages/z5743.html, archived Nov. 6, 2001, 2 pages.
Nortel Networks, Mertek's JCS Cable Assembly simplifies a difficult task for Meridain 1 installers, 2004, 2 pages.

(Continued)

*Primary Examiner*—Jinhee Lee
(74) *Attorney, Agent, or Firm*—Perkins Coie LLP

(57) ABSTRACT

A cable assembly includes a plurality of electrical or fiber-optic cables, a spacer, and a collar. The cables are arranged lengthwise in a bundle, which includes a segment having a cross-sectional arrangement organized into a plurality of columnar sections of contiguous cables. Each columnar section has at least one cable. The spacer is disposed between the adjacent columnar sections. The spacer spans substantially entirely across a cross section of the segment of the bundle in one direction. The collar is disposed entirely around the bundle and the spacer along at least a portion of the segment. The collar is sufficiently tight such that the collar and the spacer cooperate to hold the adjacent columnar sections in substantially fixed relative positions within the cross-section of the bundle.

11 Claims, 2 Drawing Sheets

U.S. PATENT DOCUMENTS

| | | | |
|---|---|---|---|
| D314,324 S | | 2/1991 | Allison |
| 5,625,737 A | * | 4/1997 | Saito .......................... 385/137 |
| 5,828,009 A | | 10/1998 | James et al. |
| 5,940,962 A | | 8/1999 | Shima et al. |
| 6,642,454 B1 | | 11/2003 | Mercier et al. |
| 2003/0132021 A1 | | 7/2003 | Gareis |

OTHER PUBLICATIONS

Mertek Industries, LLC, CAD image of JCS Cable Assembly, date unknown, 1 page.

Mertek JCS Cable Assembly, product dated Nov. 4, 2004, 11 pages of photographs.

* cited by examiner

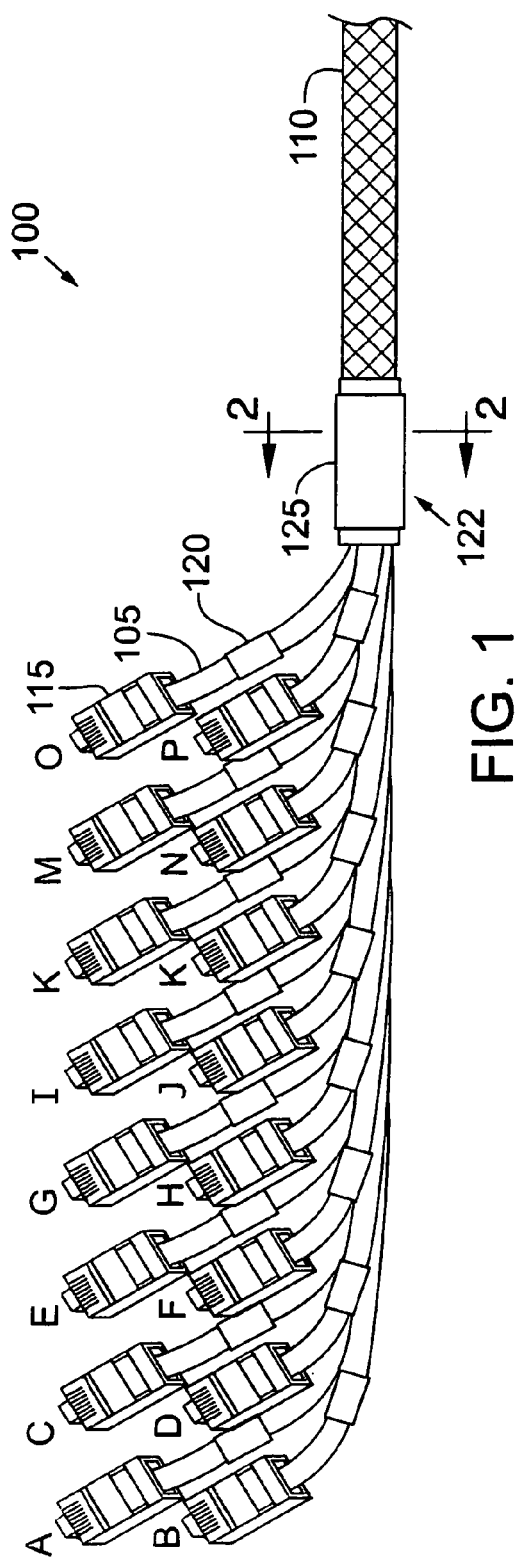
FIG. 1
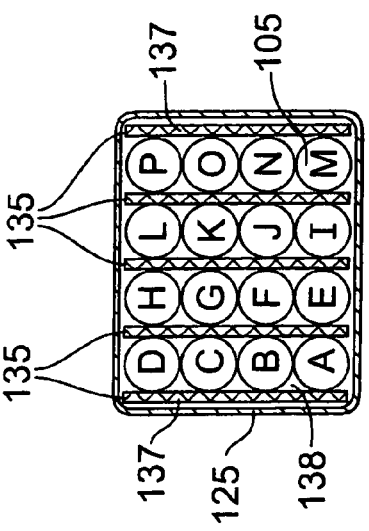
FIG. 2
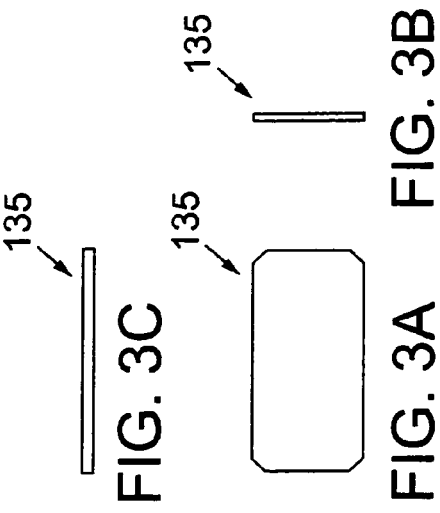
FIG. 3A
FIG. 3B
FIG. 3C

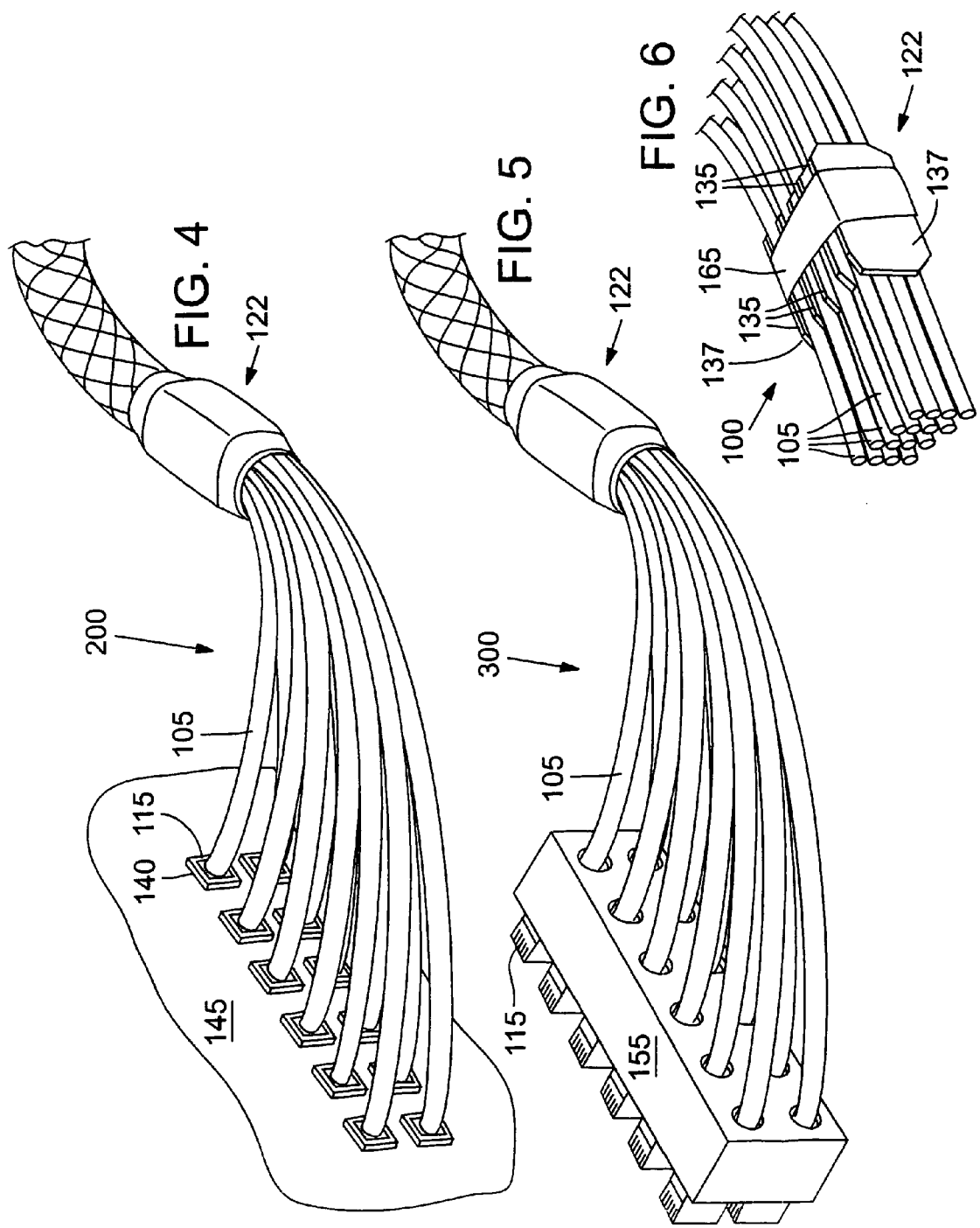

CABLE HARNESS BREAKOUT AND METHOD FOR ITS ASSEMBLY

RELATED APPLICATIONS

This application is a divisional of U.S. application Ser. No. 10/836,586, filed Apr. 29, 2004.

TECHNICAL FIELD

This disclosure relates generally to cable assemblies and more particularly to a cable harness breakout and methods for its assembly.

BACKGROUND

Cables for carrying power, data, control, or other electrical or optical signals are often bundled to simplify their handling, connection, or routing. It is well known to utilize a harness including rings, straps, collars, and/or an outer sheath around a plurality of cables to form and maintain a bundle comprising those cables. Where the harness ends, typically near the ends of the cables, the cables flare out to allow the individual cables or sub-bundles to extend to their own destinations. Bundles themselves may be bundled together in a super-bundle.

It is also known in the prior art to have cables of different lengths exiting a harness, so as to allow sufficient length for each particular cable to reach its desired destination. Typically, the individual cables are not and cannot be controllably arranged across the cross section of the bundle at its end to enable orderly routing of the cables in the proper directions, without, for example, undue crossing of individual cables.

One known structure for bundling cables utilizes a sheath to contain the cables along the majority of the length of the bundle. At the ends of the bundle, a collar, such as heat-shrink tubing, is provided just before the point of breakout. The individual constituent cables flare out from the heat-shrink collar in varying lengths to reach their destinations. Unfortunately, the cables in the bundle are prone to relative slipping and displacement across the cross-sectional area of the bundle. That can be attributable to a natural tendency of the cables to form into a bundle having a circular perimeter outline, especially within a heat-shrink tubing or other constrictive member around the cables. That relative slipping, displacement, and tendency to form a circular bundle can cause the cross-sectional pattern of the cables as they exit the harness to mismatch their pattern of target destinations. That can be problematic. The results can include (1) undesirable lengthwise stretching or bend strain on the cables; (2) undesirable strain on the cables' terminating connectors and their destination connector ports; (3) greater probability of connecting a cable to a wrong destination; (4) disorderly and unsightly crossing of cables; (5) extra time and effort for a person to connect the cables to their destinations; and even (6) inability to connect a cable to its destination.

SUMMARY

A cable assembly comprises a plurality of electrical or fiber-optic cables, a spacer, and a collar. The cables are arranged lengthwise in a bundle, which includes a segment having a cross-sectional arrangement organized into a plurality of columnar sections of contiguous cables. Each columnar section has at least one cable. The spacer is disposed between adjacent columnar sections of cables and thus forms a dividing line between the adjacent columnar sections. The spacer spans substantially entirely across a cross section of the segment of the bundle in one direction. The collar is disposed entirely around the bundle and the spacer along at least a portion of the segment. The collar is sufficiently tight such that the collar and the spacer cooperate to hold the adjacent columnar sections in substantially fixed relative positions within the cross-section of the bundle.

A method assembles a plurality of electrical or fiber-optic cables into a cable harness breakout. Segments of a first subset of the plurality of cables are arranged into a contiguous first group. A substantially rigid spacer is placed along a side of the first group. Segments of a second subset of the plurality of cables are arranged into a contiguous second group, and a side of the second group is placed along the spacer, so that the first group and the second group have an arranged configuration. The first group, the spacer, and the second group are secured together in the arranged configuration.

A cable bundle breakout harness comprises a plurality of cables, a set of spacers, and a collar. Coextensive segments of the cables are arranged in a rectangular array having N rows and M columns, where M and N are natural numbers (i.e., non-zero positive integers). The set of spacers demark the interior boundaries of the N rows. The collar surrounds the cables and the set of spacers.

Another cable harness breakout is near an end of a bundle of electrical and/or fiber-optic cables. The cable harness breakout comprises means for arranging coextensive segments of the cables into a cross-sectional arrangement having a regular, desired configuration. The cable harness breakout also comprises means for holding the coextensive segments of the cables in substantially fixed relative positions in the desired configuration.

BRIEF DESCRIPTION OF THE DRAWINGS

FIG. 1 is a plan view of a cable assembly, according to one embodiment.

FIG. 2 is an enlarged cross-section view of the cable assembly of FIG. 1 taken along line 2—2 of FIG. 1.

FIGS. 3A, 3B, and 3C are respective front, side, and top views of a spacer utilized in the cable assembly of FIG. 1.

FIGS. 4 and 5 are pictorial views of alternate cable assemblies in various uses.

FIG. 6 is a pictorial view of the cable assembly of FIG. 1 during a state of partial assembly.

DETAILED DESCRIPTION OF PREFERRED EMBODIMENTS

With reference to the above-listed drawings, this section describes particular embodiments and their detailed construction and operation. As one skilled in the art will appreciate, certain embodiments are capable of achieving certain advantages over the known prior art, including some or all of the following: (1) reduced lengthwise stretching and bend strain on the cables; (2) reduced strain on the cables' terminating connectors and their destination connector ports; (3) less chance of connecting a cable to a wrong destination; (4) more orderly and aesthetically appealing appearance of cables exiting the bundle harness; (5) improved ability to connect a cable to its destination; and (6) labor savings when connecting the cables to their destinations. These and other advantages of various embodiments will be apparent upon reading the following.

FIG. 1 is a plan view of a cable assembly 100, according to one embodiment. The cable assembly 100 comprises sixteen individual cables 105 bundled in a sheath 110 (not shown to scale). The number of cables may be more or less; sixteen cables are shown only as an illustration. The sheath 110 is an elongate, generally tubular-shaped member encircling the bundle of cables 105 along a major portion of the bundle length. The sheath 110, which is optional, may be a mesh of plastic fibers, fabric, or any other sheet material that can be formed in a closed, generally tubular shape. At the end of each cable 105 is a connector 115. Although the connector 115 is not required in all cases, it is typically present. Optionally, around each cable 105 is label 120, which may be used, for example, for identifying each cable 105. The sixteen cables 105 in FIG. 1 are labeled A, B, C, . . . , P.

Along a segment of the bundle of cables 105 in the cable assembly 100, typically near the cables' end is a breakout harness 122, from which the cables 105 breakout from the bundle. The breakout harness 122 is optionally surrounded by a collar 125. The collar 125 may be heat shrink tubing, for example. The collar 125 can be bonded to the sheath 110 by having the collar 125 surround a portion of the end of the sheath 110 and by providing an adhesive therebetween. Other means for attaching the collar 125 and the sheath 110 are possible, if such an attachment is desired.

FIG. 2 is an enlarged cross-section view of the cable assembly 100 within the collar 125, taken along the line 2—2 of FIG. 1. Thus, FIG. 2 shows the cross section of the bundle of cables 105 near the point of breakout. As shown in FIG. 2, the sixteen cables 105 are arranged in a square four-by-four array. Although other arrangements are possible, the cables 105 within the collar 125 can be arranged in a pattern that is roughly congruent or readily mapped to the pattern in which their ends are desirably directed. Typically that pattern is rectangular, a fact dictated at least in part by the nature of the equipment to which the cables are to be connected. For example, the cables 105 labeled A–D, which extend farthest to the left in FIG. 1, are arranged in the leftmost column in FIG. 2. similarly, the cables 105 labeled E–H, I–L, and M–P respectively extend lesser distances away from the collar 125 and are respectively arranged in separate columns from left to right in FIG. 2. In this case, the cables 105 labeled A–D have generally longer extension lengths (measured from the breakout harness 122 to the respective connector 115) than those labeled E–H, which are longer than those labeled I–L, which are longer than those labeled M–P.

Also shown in FIG. 2 are a number of spacers 135, extending along the sides of each column of cables 105 within the collar 125. The collar 125 aids in holding the spacers 135 and the cables 105 together in a desired arrangement. An illustrative spacer 135 is shown in perspective views in FIG. 3. The spacers 135 can be formed of plasticized cardboard, plastic, wood, metal, or any other suitable material. The spacers 135 are dimensioned so as to approximately match the dimensions of the desired cross-sectional arrangement of the cables 105 within the collar 125. The height and width of the spacer 135 is typically dictated by the size and number of cables in the bundle. The spacers 135 ideally have a thickness sufficient to be substantially rigid and to resist breaking. The spacers 135 may be more or less flexible to suit a particular use. The spacer 135 is shown as a contiguously solid piece, but it need not be. For example, the spacer 135 may be formed with holes in its body.

The spacers 135 form and maintain the cables 105 in a desired cross-sectional arrangement, such as the square array arrangement illustrated in FIG. 2, within the collar 125. In other words, the spacers 135 partition the bundle into a plurality of sections of contiguous cables. As illustrated in FIG. 2, the sections are one-by-four columns. Other arrangements and section shapes are possible. For instance, the spacers 135 may be oriented horizontally, rather than vertically, so as to partition the space within the collar 125 into rows, rather than columns. In fact, the difference between rows and columns is one of perspective, not substance.

Furthermore, straight planar spacers in both the vertical and horizontal can be used together. One method for doing so is to provide notches on the spacers lengthwise (horizontally in FIG. 3) of a width slightly greater than the thickness of the spacer, such that a notch of a horizontal spacer cooperates with a notch of a vertical spacer in a mating relationship. For example, a such pair of mating horizontal and vertical spacers could be utilized to partition the sixteen cables 105 in FIG. 2 into four two-by-two sections.

Also shown in FIG. 2 are outermost spacers 137. Although the outermost spacers 137 are optional, they provide additional structural stability. They may be omitted when, for example, the collar 125 is sufficiently strong by itself or the number of cables is small.

Certain of the other spacers 135 illustrated in FIG. 2 can be omitted. For example, it is not necessary that the columns formed by the spacers 135 be only one cable wide; thus, for example, the second and fourth spacers 135 can be omitted, so as to form two columns two cables in width.

Moreover, the spacers 135 may have protrusions along its front and/or back faces. Such protrusions can advantageously be positioned to correspond to and fill (at least partially) cavities 138 formed along the side edges of two round cables when they are placed atop one another. A desirable cross-sectional shape of such a protrusion is triangular, as viewed in FIG. 2, preferably with slightly concave walls to best match the cross-sectional shape of the cables 105 along the cavities 138 filled by the protrusions.

Indeed, as an alternative to the interior spacers 135 shown in FIG. 2, one could utilize three separate pieces having an approximate diamond shape. One such piece could be set within the cavity formed by four cables 105 arranged two-by-two (e.g., the cables 105 labeled A, B, F, and E). Preferably, such pieces would have generally concave sides to best match the cross-section shape of the cavity they are intended to fill.

As another alternative, each cable 105 in the pertinent segment of the bundle could be fitted with an individual collar having an inside sidewall that is circular in cross section, so as to conform to the cable 105, and an exterior cross-sectional perimeter that is generally square or rectangular. The cables 105 outfitted with such collars could then be stacked like blocks in a desired arrangement and held together with an interlocking mechanism and/or an outside wrap, such as the collar 125. In that case, the set of such collars constitute the spacers.

In still another alternative, the set of spacers together may be formed in place about and between the cables 105, such as by molding or extrusion. In that case, the collar 125 may not be necessary.

Returning to the case in which the spacers are sheet-like members, the spacers need not be straight planar sections; spacers may be curved segments or even closed tubular pieces. For example, a set of spacers may be concentric cylindrically shaped pieces.

Although the spacers 135 have been illustrated herein as separate pieces, they may take other forms or may be joined. For example, the five vertical spacers 135 shown in FIG. 2 may be joined to a horizontal spine along the top or bottom of the bundle. Such a spine, which acts like a mechanical "backplane," can optionally be formed of a flexible material to facilitate access to the columnar-shaped sections during assembly.

As one can tell from the variety of forms that the spacers can take, the term "spacer" is a broad term referring to any substantially rigid material or collection of pieces positioned between cables to help align sections of cables in substantially fixed relative positions.

FIGS. 4 and 5 are perspective views of alternative cable assemblies 200 and 300, respectively. In FIG. 4, the connectors 115 are engaged in mating connector ports 140 distributed across a surface 145 in a rectangular six-by-two (or, alternatively, three-by-four) arrangement. Thus, the cable assembly 200 near the point of breakout advantageously is consistent with that arrangement of target connector ports 140 on the surface 145. For example, a number of spacers can be utilized to partition the exiting cables 105 in a corresponding six-by-two cross-sectional arrangement. As another example, spacers can be utilized to partition the exiting cables in three columns of four cables, with each column supplying cables 105 to either the left, middle, or right two-by-two set of four connector ports 140. The latter arrangement may be more stable, as it more closely conforms to the natural tendency of the cables to bunch together as closely as possible.

In FIG. 5, the cable assembly 300 is shown with its connectors 115 held in place in a desired arrangement by a ganged holder 155. The cable assembly 300, like the one in FIG. 4, utilizes spacers to divide the cross-section of the bundle of exiting cables into sections that in some sense match or more closely match the spatial layout of the cables 105 entering the ganged holder 155.

The cable assemblies 200 and 300 are examples of a bundle of cables approaching a flat surface at a parallel or somewhat parallel angle and the cable destinations being distributed across the face of that surface. In that case, the individual cables extending out the breakout point bend to reach their destinations. In that case, the cables on the interior side of the bend are desirably directed to targets nearest to the approach side, while cables progressively toward the other side of the bundle are desirably directed to targets more distant from the approach side. Thus, the cables near the approach side of the bundle (the side with the smaller turn radius) typically require the shortest extension length to reach their targets, while the extension lengths become progressively greater toward the opposite side of the bundle (the side with the larger turn radius). The cable assembly 300 is especially useful when the cables 105 are require to bend by a known amount. In that case, the breakout harness 122 holds the cables 105 in a desired arrangement on one end, the ganged holder 155 holds the cables 105 in a desired arrangement on the other end, and the extension lengths can be cut precisely to accommodate the bend.

In another expected use, a cable bundle is designed to approach a flat surface (e.g., surface 145), in which the cable destinations (e.g., connector ports 140) lie, perpendicularly. In that case, the bundle end near the breakout point is desirably designed such that cables going furthest to the right are located near the furthest right side of the bundle, cables going furthest to the left are located near the furthest left side of the bundle, etc. In that case, cables near the periphery of the bundle may require a greater extension length to reach their destinations than would the cables near the center of the bundle, assuming that the bundle approaches the surface near the center of the pattern of destinations.

FIG. 6 is a pictorial view of a section of the cable assembly 100 during a state of partial assembly. More specifically, FIG. 6 shows the cable assembly 100 in the vicinity of its breakout harness 122 before the collar 125 has been attached. As can be seen, the breakout harness 122 comprises five spacers 135 dividing the set of cables 105 into four columns and holding the cables 105 in a four-by-four cross-sectional arrangement. Thus, as illustrated, the spacers 135 and columns of cables 105 have been laid out in an alternating pattern, beginning with an outermost spacer 137 on one side, a column of four cables, another (interior) spacer 135, another column of four cables, and so on, concluding with a final outermost spacer 137 on the far opposite side. The sandwiched bundle arrangement of cables 105 and spacers 135 are held together by an adhesive tape 165 wrapped around the outermost spacers 137 and along the top and bottom of the bundle. The adhesive tape 165 can be, for example, made of a heat-resistant material, such as KAPTON brand polyimide film made by E. I. du Pont de Nemours and Company. The partially assembled breakout harness 122, as illustrated in FIG. 6, can then be surrounded by the collar 125, such as a heat-shrink tube, which is then heated to shrink and form around the cables 105, spacers 135. Furthermore, on the bundled side of the breakout harness 122, the cables 105 can be encased by the sheath 110. A portion of the sheath 110 can be extended under the heat-shrink tube before it is shrunk, and a layer of adhesive material can be provided on the portion of the sheath 110 under the heat-shrink tube in order to secure the sheath 110 and the heat-shrink tube together.

Although the partially assembled cable assembly 100 illustrated in FIG. 6 is shown with vertically oriented spacers 135, they could just as easily be oriented horizontally. In some sense, the vertical-horizontal distinction is an arbitrary matter of perspective.

The terms and descriptions used herein are set forth by way of illustration only and are not meant as limitations. Those skilled in the art will recognize that many variations can be made to the details of the above-described embodiments without departing from the underlying principles of the invention. For example, although the invention is described with reference to electrical cables, that is done only to facilitate easy understanding; the concepts described herein are equally applicable to cables of any type (e.g., fiber-optic, hydraulic, to name just a couple). The scope of the invention should therefore be determined only by the following claims, and their equivalents, in which all terms are to be understood in their broadest reasonable sense unless otherwise indicated.

The invention claimed is:

1. A cable harness breakout comprising:
   a plurality of cables of at least coextensive segments of which includes a cross section arranged in a rectangular array having N rows and M columns, wherein M and N are natural numbers greater than 2, each of the N rows including a plurality of contiguous cables;
   a set of spacers demarking the interior boundaries of the N rows, wherein the spacers separate adjacent rows of the plurality of contiguous cables in the cable harness breakout; and
   a collar surrounding and adhering to at least some of the cables and the set of spacers with sufficient tightness such that the collar and the spacers cooperate to hold the plurality of cables in substantially fixed relative positions within the cross-section of the cable harness breakout.

2. The cable harness breakout of claim 1, wherein the set of spacers comprises N−1 separate pieces.

3. The cable harness breakout of claim 1, further comprising:
    two spacers demarking the exterior boundaries of the topmost and bottommost rows.

4. The cable assembly of claim 1, wherein at least one of the spacers is a single, unitary piece.

5. The cable assembly of claim 1, wherein the spacers are approximately rectangular and sheet-like in shape and lies in a plane generally parallel to the lengthwise direction of the cables in the segment.

6. The cable assembly of claim 1, wherein the spacers and the collar are separate pieces.

7. The cable assembly of claim 1, wherein at least one of the spacers is a contiguously solid piece.

8. The cable assembly of claim 1, wherein at least one of the spacers is formed of a plasticized cardboard.

9. The cable assembly of claim 1, wherein the collar comprises a heat-shrink tube along the segment.

10. The cable assembly of claim 1, further comprising:
    a piece of adhesive tape surrounding the plurality of cables and the spacers and sticking to one or more of the cables and the spacers the piece of tape being surrounded by the collar.

11. The cable assembly of claim 1, further comprising:
    an outer spacer positioned between the collar and one of the N rows.

* * * * *